United States Patent [19]

Schroeder

[11] Patent Number: 4,544,083

[45] Date of Patent: Oct. 1, 1985

[54] BUTTER DISPENSER

[76] Inventor: Matt Schroeder, 650 N. Kaspar, Arlington Heights, Ill. 60004

[21] Appl. No.: 595,403

[22] Filed: Mar. 30, 1984

[51] Int. Cl.⁴ .......................... B67D 5/22; B67D 5/42
[52] U.S. Cl. ..................................... 222/47; 222/157; 222/390; 74/89.15; 401/12; 401/175; 384/439
[58] Field of Search ............................ 222/390, 157, 47; 401/12, 175, 68; 239/324; 74/89.15; 384/439, 440, 428

[56] References Cited

U.S. PATENT DOCUMENTS

| 2,589,000 | 3/1952 | Vani | 401/55 |
| 2,845,707 | 8/1958 | Redmond | 222/390 |
| 2,876,161 | 3/1959 | Gieschi | 401/68 |
| 2,935,191 | 5/1960 | Leshin | 401/75 |
| 2,980,247 | 4/1961 | DiGiantomasso | 401/79 |
| 3,374,048 | 3/1968 | Koskinen | 401/98 |
| 3,907,441 | 9/1975 | Idec et al. | 401/175 |
| 4,241,852 | 12/1980 | Klem | 222/387 |
| 4,298,036 | 11/1981 | Horvath | 222/390 |

Primary Examiner—Joseph J. Rolla
Assistant Examiner—Andrew Jones
Attorney, Agent, or Firm—Douglas B. White

[57] ABSTRACT

In a butter dispenser having a hollow body for receiving a stick of butter and having a closure member at one end, a selectively, rotatable shaft is provided having first a bearing surface for rotating freely within the hole in the closure member, a threaded plug for engaging the threads in the closure member and causing the shaft to be removed through the hole in the closure member when the shaft is rotated in a first direction, and having the remainder of the shaft threaded in a second direction to provide a rotating screw drive force against a piston arranged for travel along this remaining portion of the shaft when the shaft is rotated in a second direction.

7 Claims, 5 Drawing Figures

U.S. Patent   Oct. 1, 1985   4,544,083
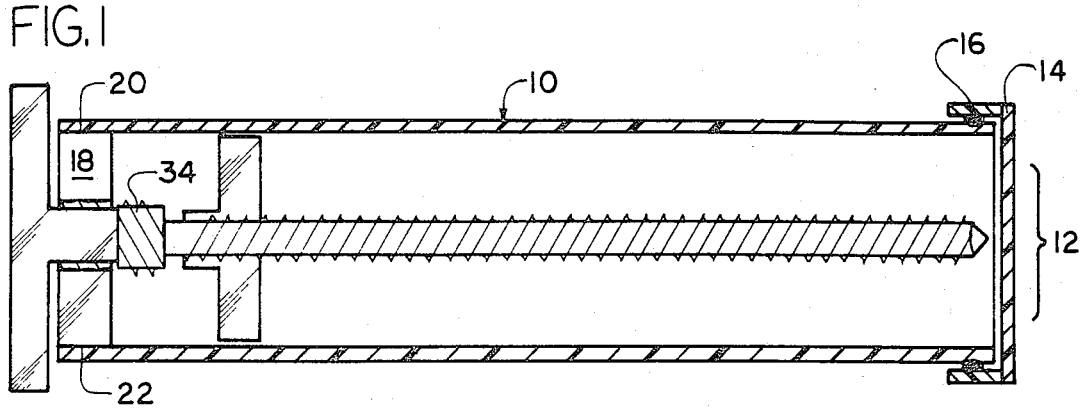
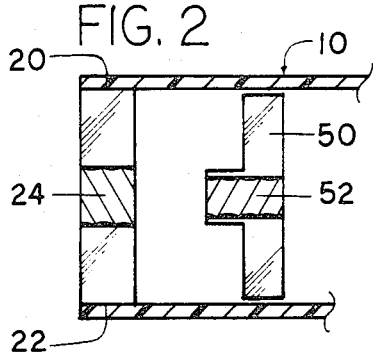
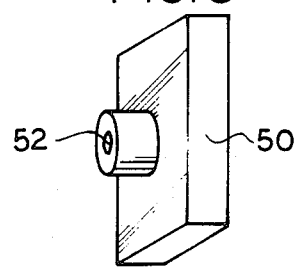
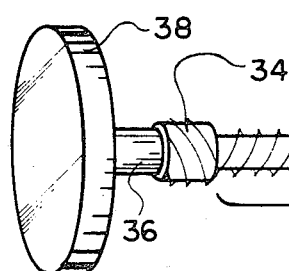
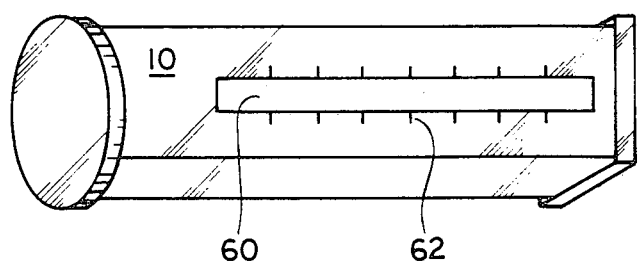

BUTTER DISPENSER

BACKGROUND OF THE INVENTION

This invention relates to food dispensers and more particularly to dispensers for butter, lard, or other materials of similar consistency. Specifically this invention relates to improvements in a dispensing device making the device easier to disassemble and clean.

Generally, butter has been dispensed and applied to food by means of a knife from a tub or paper wrapped stick thereof. Recent innovations, such as U.S. Pat. No. 2,980,247, provides for a butter holder and dispenser whereby the butter may be selectively ejected from the end of a housing within which it is stored and held. It is of paramount importance in such devices to provide complete disassembly so the device may be cleaned throughout, and also for this disassembly to be simple and quick or the device would not be practical as a consumer item. In U.S. Pat. No. 2,980,247 issued to R. R. DiGiantomasso, there is provided a rectangular housing for accepting a paper wrapped stick of butter as is customarily sold in the grocery stores. A piston is affixed on the end of a shaft and the shaft is rotated within a threaded opening in the closed end of the housing to force the piston against the butter and eject the butter from the open end of the housing. In this prior dispenser, apparatus is provided for quickly and simply opening the closed end of the dispenser for cleaning, but no means are provided for disassembling the shaft from the piston, or, more importantly, removing the shaft from the screwed opening in the closure member. When dealing with butter, lard, or similar materials, all portions of the device must be disassembled and cleaned as the oily material tends to coat the whole device.

Briefly stated, the preferred embodiment of the present invention provides an elongated, rectangular, hollow body for receiving a traditional stick of butter having a fixed closed end with a threaded hole therein. A selectively rotatable shaft is provided having first a bearing surface for rotating freely within the hole in the closure member, a threaded plug for engaging the threads in the closure member and causing the shaft to be removed through the hole in the closure member when the shaft is rotated in a first direction, and having the remainder of the shaft threaded in a second direction to provide a rotating screw drive force against a piston arranged for travel along this remaining portion of the shaft when the shaft is rotated in a second direction.

The objects and advantages of the invention will become apparent upon reading the following detailed description and upon reference to the drawings, in which:

FIG. 1 is a cross sectional view of the butter dispenser device of the present invention.

FIG. 2 is a cross sectional, partially cut-away view of the dispenser of FIG. 1 with the drive shaft removed.

FIG. 3 is a pictorial view of the piston of the present invention.

FIG. 4 is a pictorial view of the drive shaft of the present invention.

FIG. 5 is a pictorial view of the fully assembled butter dispenser of the present invention.

While the invention will be described in connection with the preferred embodiment, it will be understood that I do not intend to limit the invention to that embodiment. On the contrary, I intend to cover all alternatives, modifications and equivalents as may be included within the spirit and scope of the invention as defined by the appended claims.

DESCRIPTION OF THE PREFERRED EMBODIMENT

Turning now to FIG. 1 there is shown a rectangular housing member 10, shown in cross section and positioned to receive an appropriately sized stick of butter from the loading and dispensing end 12. This end 12 is shown in FIG. 1 closed with a lid or cap 14 secured by friction or catch means 16. Closing the opposite end of the housing there is provided closure member 18 affixed to and integral with the sides of the housing 20 and 22. Proximate the center of this closure member there is provided a threaded hole 24 best seen in FIG. 2, having a right hand thread provided therein.

Arranged for insertion within this hole there is provided a shaft member 30 having a sharp protruding end 32 for penetrating the material to be dispensed. More particularly, there is provided a right hand threaded plug 34 arranged to thread through the closure hole 24. When the shaft is inserted through the closure hole and the plug threaded through the closure hole, the bearing surface area 36 fills the closure hole and rotates against the protruding thread thereof as a bearing surface. In the preferred embodiment of the present invention there is provided a knurled knob 38 for selectively rotating the shaft. On the remainder of the shaft, substantially equal to the length of the housing, there is provided a left hand threaded portion 40 for driving the piston as more fully described below.

Turning once again to FIG. 2 there is shown the piston 50 within the housing positioned for insertion of the shaft member. There is further provided, within the piston, a threaded hole 52 arranged to mate with the threaded portion 40 of the shaft. When the shaft is inserted, rotation in a first direction will cause the piston to travel from the closure portion of the housing to the open portion of the housing, thereby dispensing the butter or other like material in a selective and controlled manner.

Once the dispenser is empty, the piston is easily removed by continued rotation of the shaft. Following removal of the piston the shaft is rotated in the opposite direction with a slight pull on the knurled knob to engage threads on the plug 34 and rotate the shaft out of the housing. Being fully disassembled, the device may be thoroughly cleaned in hot soapy water.

Turning now to FIG. 5 there is shown a further feature of the present invention. A transparent window 60 having graduations 62 thereon is provided in the side of the housing. The position of the piston can readily be seen through this window and provides information on the amount of butter remaining as well as allowing the user to measure out prescribed amounts for cooking or dietary purposes.

Accordingly there has been shown and described an improved butter dispenser having a housing member for receiving a traditional stick of butter and having a fixed closed end with a threaded hole therein. A selectively rotatable shaft is provided having first a bearing surface for rotating freely within the hole in the closure member, a threaded plug for engaging the threads in the closure member and causing the shaft to be removed through the hole in the closure member when the shaft is rotated in a first direction, and having the remainder of the shaft threaded in a second direction to provide a rotating screw drive force against a piston arranged for travel along this remaining portion of the shaft when the shaft is rotated in a second direction.

I claim:

1. A device for holding and dispensing butter or like material comprising:
 a housing having a first and second end defined thereon, said first end arranged for discharge of the dispensed material;
 sealing means for providing sealing closure of said second end of said housing and having a hole positioned therein bearing a screw thread;
 a shaft of substantially the same length as said housing having a first portion bearing a screw thread of a first direction and extending substantially the full length of said shaft, and having a second portion bearing a screw thread in a second direction, and having a third portion exhibiting a smooth bearing surface, said shaft being operatively positioned within said sealing means whereby during rotation in a first direction said shaft turns on its bearing surface within said hole in said sealing means, and during rotation in said second direction said second portion of said shaft engages the threads in the hole of said sealing means and withdraws the shaft from the housing;
 means affixed to said shaft proximate said third portion for providing selective rotation of said shaft; and
 a piston arranged to engage the inside contour of said housing and having a threaded hole therein, and arranged for travel along said first portion of said shaft upon selective rotation of said shaft to provide dispensing pressure upon the butter.

2. The device of claim 1 wherein said sealing means comprises a plug integral with said housing.

3. The device of claim 2 wherein said housing is comprised of an elongated tube of rectangular cross section.

4. The device of claim 3 wherein said housing further comprises a diaphanous elongated window along one side thereof proximate said first end.

5. The device of claim 4 further comprising graduation marks proximate said window.

6. The device of claim 5 further comprising a cap member arranged to selectively cover said first end of said housing and having edges thereof protruding proximate the extension of said housing, and further comprising attachment means to secure said cap to said housing.

7. The device of claim 6 wherein said attachment means comprises a friction means whereby said cap member edges frictionally engage said friction means.

* * * * *